(No Model.)

J. H. MONTGOMERY & J. H. HAMMOND.
SOAP BUBBLE BLOWER.

No. 534,277. Patented Feb. 19, 1895.

Witnesses:

Inventors.

UNITED STATES PATENT OFFICE.

JAMES H. MONTGOMERY AND JOHN H. HAMMOND, OF DENVER, COLORADO; SAID HAMMOND ASSIGNOR TO SAID MONTGOMERY.

SOAP-BUBBLE BLOWER.

SPECIFICATION forming part of Letters Patent No. 534,277, dated February 19, 1895.

Application filed July 30, 1894. Serial No. 518,992. (No model.)

*To all whom it may concern:*

Be it known that we, JAMES H. MONTGOMERY and JOHN H. HAMMOND, residing at Denver, in the county of Arapahoe and State of Colorado, have invented a new and novel Soap-Bubble Blower, of which the following is a specification.

Our invention relates to improvements in soap bubble blowers, of the series blowing kind.

The objects of our improvements are, first, to provide a blower capable of retaining solution for a series of bubbles; second, to provide a means, to prevent soiling the operator's hand, and, third, to provide a means whereby the operator may give a blower any desired motion, or direction while continuously blowing into the same. We attain these objects, by the mechanism illustrated in the accompanying drawings, in which—

Figure 1:
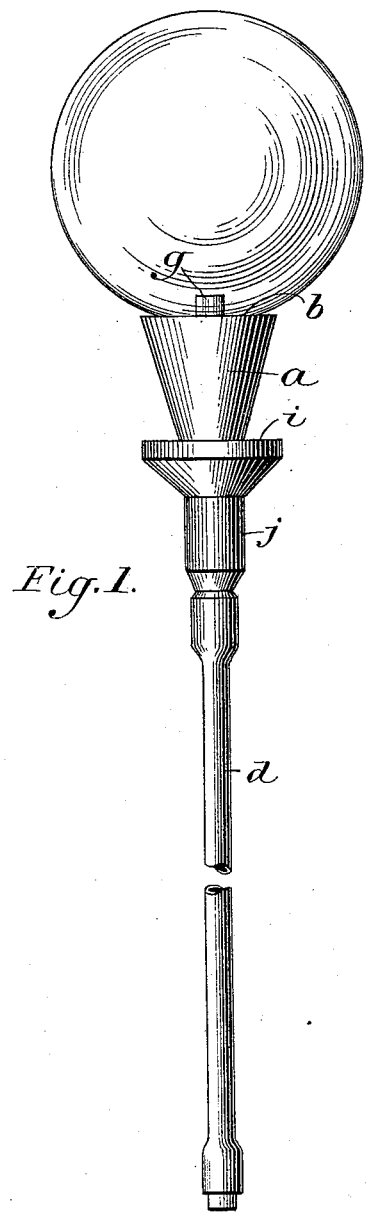
Figure 2:
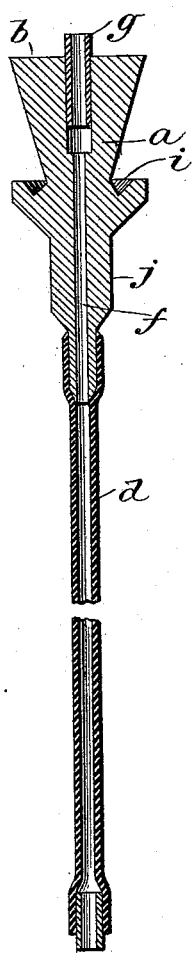
Figure 3:
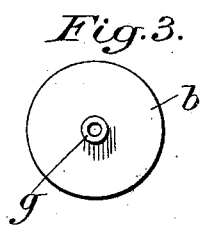

Figure 1, is a perspective, representing a bubble on the blower. Fig. 2, is a cross section of the blower, through its entire length. Fig. 3, is a top view of the blower.

Similar letters refer to similar parts in the several views.

The bubble blower $a$, is constructed of a porous absorbent material, preferably, a soft open grained wood.

The end $b$, is where the bubble is formed. The adjustable tube $g$, is for blowing small bubbles, and may be pushed into the blower $a$, when not required. The part $j$, is to hold the blower by while operating. The cup shaped part $i$, is to catch the drip, when the bubble is turned upward, and prevent soiling the operator's hand. The flexible tube $d$, conveys the air from the operator's mouth to the blower. The hole $f$, we make of small diameter, as less film of soap, will cover the same, enabling a greater number of bubbles, to be made with one charge of solution.

To operate the blower, place the end of the flexible tube $d$, in the mouth, grasp the blower between the thumb and fingers, at $j$, and after dipping the end $b$, into a proper solution to make soap bubbles, gently blow through the flexible tube $d$, and a bubble will be formed. Then, by a quick side movement, of the blower $a$, while continuously blowing through the tube $d$, a series of bubbles may be thrown from the blower, the absorbent blower $a$, only giving off enough solution, each time, for each bubble. The flexible tube $d$, permits the operator to give the blower, any desired motion, or position, without removing the blower tube $d$, from the mouth.

Having described our invention and its operation, what we claim as new and novel, and desire to secure by Letters Patent, is—

1. In a soap bubble blower having an air passage through its body, a cup shaped part adapted to catch the drip from the bubble when the bubble is turned upward, a blower head $b$, located on one end, and a tube $g$, projecting beyond the blower head $b$, and adapted to slide into it when not required, substantially as described and for the purposes set forth.

2. In a soap bubble blower having an air passage through its body, a blower head $b$, on one end, an adjustable tube $g$, located in the said air passage and adapted to be drawn out and beyond the blower head $b$, when required, and a cup shaped part adapted to catch the drip from the blower head when the bubble is turned upward, combined, with a flexible means for conveying air to the blower, substantially as described and for the purposes set forth.

JAMES H. MONTGOMERY.
JOHN H. HAMMOND.

Witnesses:
JOHN FALLERS,
FRED FALLERS.